(12) United States Patent
Banga et al.

(10) Patent No.: US 10,846,396 B1
(45) Date of Patent: Nov. 24, 2020

(54) DOWNLOADING DATA IN A DEDICATED VIRTUAL MACHINE

(71) Applicant: HEWLETT-PACKARD DEVELOPMENT COMPANY, L.P., Spring, TX (US)

(72) Inventors: Gaurav Banga, Cupertino, CA (US); Ian Pratt, Cambridge (GB); Vikram Kapoor, Cupertino, CA (US); Kiran Bondalapati, Los Altos, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 863 days.

(21) Appl. No.: 14/328,189

(22) Filed: Jul. 10, 2014

Related U.S. Application Data

(63) Continuation-in-part of application No. 13/526,354, filed on Jun. 18, 2012, now Pat. No. 8,839,245, and a continuation-in-part of application No. 13/419,345, filed on Mar. 13, 2012, now Pat. No. 9,148,428, and a continuation-in-part of application No. 13/115,354, filed on May 25, 2011, now Pat. No. 8,972,980.

(51) Int. Cl.
*G06F 21/53* (2013.01)
*G06F 21/62* (2013.01)
*G06F 9/455* (2018.01)
*G06F 9/46* (2006.01)

(52) U.S. Cl.
CPC ............. *G06F 21/53* (2013.01); *G06F 9/455* (2013.01); *G06F 9/468* (2013.01); *G06F 21/62* (2013.01); *G06F 2221/2149* (2013.01)

(58) Field of Classification Search
CPC .......... G06F 9/468; G06F 9/455; G06F 21/53; G06F 2221/2149; G06F 21/62
See application file for complete search history.

(56) References Cited

U.S. PATENT DOCUMENTS

| | | | |
|---|---|---|---|
| 6,948,044 B1 | 9/2005 | Chandrasekaran |
| 7,171,523 B2 | 1/2007 | Yamasaki |
| 7,506,265 B1 | 3/2009 | Traut et al. |
| 8,146,084 B1 | 3/2012 | Meketa |
| 8,346,727 B1 | 1/2013 | Chester et al. |
| 8,543,641 B2 | 9/2013 | Cherukuri et al. |

(Continued)

FOREIGN PATENT DOCUMENTS

WO 2008073618 A2 6/2008

*Primary Examiner* — Emerson C Puente
*Assistant Examiner* — Jonathan R Labud
(74) *Attorney, Agent, or Firm* — HPI Patent Department

(57) ABSTRACT

Embodiments of the invention enable any request to download data to a computer system to be performed such that the requested data is stored in a dedicated virtual machine. A request to transfer data from an external location to the computer system is received. The request may originate from a process in a virtual machine or a host operating system. A connection with the external location using parameters identified in the request. The request is performed by transferring the data from the external location to a dedicated virtual machine which does not have access to the file system and cannot persistently store data on the computer system. One or more dedicated virtual machines may be instantiated as needed. A single dedicated virtual machine may accommodate multiple downloads concurrently.

22 Claims, 3 Drawing Sheets

(56) References Cited

U.S. PATENT DOCUMENTS

| | | | |
|---|---|---|---|
| 2002/0062342 A1* | 5/2002 | Sidles | G06F 17/243 |
| | | | 709/203 |
| 2002/0099844 A1* | 7/2002 | Baumann | H04L 47/10 |
| | | | 709/232 |
| 2004/0128670 A1 | 7/2004 | Robinson et al. | |
| 2005/0149726 A1 | 7/2005 | Joshi et al. | |
| 2005/0188361 A1 | 8/2005 | Cai et al. | |
| 2006/0004737 A1* | 1/2006 | Grzonka | G06F 21/554 |
| 2006/0101189 A1 | 5/2006 | Chandrasekaran et al. | |
| 2006/0136910 A1 | 6/2006 | Brickell et al. | |
| 2006/0143617 A1 | 6/2006 | Knauerhase et al. | |
| 2006/0184937 A1 | 8/2006 | Abels et al. | |
| 2006/0271926 A1* | 11/2006 | Hutton | G06F 8/61 |
| | | | 717/168 |
| 2006/0288343 A1 | 12/2006 | Pallister | |
| 2007/0180450 A1 | 8/2007 | Croft et al. | |
| 2007/0192329 A1 | 8/2007 | Croft et al. | |
| 2007/0250833 A1 | 10/2007 | Araujo et al. | |
| 2008/0001958 A1 | 1/2008 | Vembu et al. | |
| 2009/0007242 A1 | 1/2009 | Subramanian et al. | |
| 2009/0119541 A1 | 5/2009 | Inoue et al. | |
| 2009/0165133 A1 | 6/2009 | Hwang et al. | |
| 2009/0172820 A1 | 7/2009 | Watson | |
| 2009/0249472 A1 | 10/2009 | Litvin et al. | |
| 2009/0276783 A1 | 11/2009 | Johnson et al. | |
| 2009/0313620 A1 | 12/2009 | Sedukhin et al. | |
| 2009/0328033 A1 | 12/2009 | Kohavi et al. | |
| 2010/0122343 A1 | 5/2010 | Ghosh et al. | |
| 2010/0192224 A1* | 7/2010 | Ferri | G06F 21/53 |
| | | | 726/23 |
| 2010/0235831 A1 | 9/2010 | Dittmer | |
| 2010/0306773 A1 | 12/2010 | Lee et al. | |
| 2010/0306849 A1 | 12/2010 | Zheng et al. | |
| 2011/0035494 A1 | 2/2011 | Pandey et al. | |
| 2011/0173251 A1 | 7/2011 | Sandhu et al. | |
| 2011/0296487 A1 | 12/2011 | Walsh | |
| 2011/0302577 A1 | 12/2011 | Reuther et al. | |
| 2012/0089666 A1 | 4/2012 | Goswami et al. | |
| 2012/0210318 A1* | 8/2012 | Sanghvi | G06F 9/45558 |
| | | | 718/1 |

* cited by examiner

DOWNLOADING DATA IN A DEDICATED VIRTUAL MACHINE

CLAIM OF PRIORITY AND RELATED APPLICATION DATA

This application is a continuation-in-part of, and claims priority to, U.S. non-provisional patent application Ser. No. 13/115,354, filed May 25, 2011, having a priority date of May 28, 2010, entitled "Approaches for Securing an Internet Endpoint using Fine-Grained Operating System Virtualization," the contents of which are hereby incorporated by reference for all purposes as if fully set forth herein.

This application is a continuation-in-part of, and claims priority to, U.S. non-provisional patent application Ser. No. 13/419,345, filed Mar. 13, 2012, entitled "Seamless Management of Untrusted Data Using Virtual Machines," the contents of which are hereby incorporated by reference for all purposes as if fully set forth herein.

This application is also a continuation-in-part of, and claims priority to, U.S. non-provisional patent application Ser. No. 13/526,354, filed Jun. 18, 2012, entitled "Transferring Files Using a Virtualized Application," the contents of which are hereby incorporated by reference for all purposes as if fully set forth herein.

FIELD OF THE INVENTION

Embodiments of the invention relate to downloading data in a dedicated virtual machine.

BACKGROUND

Ensuring the security of Internet users and Internet connected devices is one of the grand challenges facing us today. The current state of affairs is very problematic, as our cyber-security infrastructure is easily and routinely subverted by cyber criminals, resulting in great economic loss. Every year brings deeper and more complex dependence by society on our cyber-infrastructure, and yet at the same time the cyber-security problem only worsens as the capabilities of the cyber-criminal mature. In effect, we are building mission-critical dependence into virtually every aspect of human activities on a cyber-infrastructure that is very insecure at its core.

The prevailing school of thought on how to protect cyber-infrastructures places great emphasis on the detection of security vulnerabilities to anticipate how an attack will take place. Once a vulnerability is detected, countermeasures are enacted. This philosophy extends to how viruses and other potentially malicious digital files are handled. Presently, there are a variety of techniques for scanning digital files to determine whether any portion of the digital file matches a signature associated with a known virus or malicious code. Once identified, such dangerous files are quarantined and appropriate security measures taken. Unfortunately, due to an increase in exploitation of file downloading vulnerabilities, attacks that exploit relatively unknown vulnerabilities are becoming more common.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for downloading data in a dedicated virtual machine are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Functional Overview

Using embodiments of the invention, download operations may be efficiently and securely performed on a computer system comprising multiple virtual machines. Embodiments of the invention enable downloading activity to be automatically and transparently migrated to a dedicated virtual machine (VM). This dedicated virtual machine may be a different operating environment (such as another virtual machine or host operating system) from where the request to initiate the download originated. The dedicated virtual machine does not have access to sensitive resources of the computer system, such as the file system, certain areas of memory, and the disk. Advantageously, any malicious code which may be inadvertently downloaded will not be able to itself download and subsequently execute data in the host or in the VM in which the malicious code resides. Further, any downloaded data which is executed within the dedicated VM will not be able to access the sensitive resources of the computer system.

Embodiments also provide for multiple concurrent download requests to each be migrated to the dedicated VM. Embodiments of the invention may be deployed within computer systems comprising a plurality of virtual machines. Any number of virtual machines may have requests to download data redirected so that the data is downloaded to the dedicated VM. While embodiments of the invention may employ a single dedicated VM, other embodiments may be configured to employ a plurality of VMs that are each dedicated to downloading data.

To illustrate the operation of one concrete example, in an embodiment, a request to download a file from a remote network location is identified and subsequently transferred to a separate VM in which the download is performed. This transfer is useful because it helps ensure that if the request to download data originated from existing malicious code undesirably present within a computer system, that existing malicious code cannot download additional malicious code into the same VM in which the existing malicious code resides. As a result, malicious code is prevented from downloading and subsequently executing data.

Additionally, automatically migrating multiple download requests to a single dedicated VM is helpful because it minimizes the number of VMs that need to be instantiated for each download.

System Overview

Figure 1:
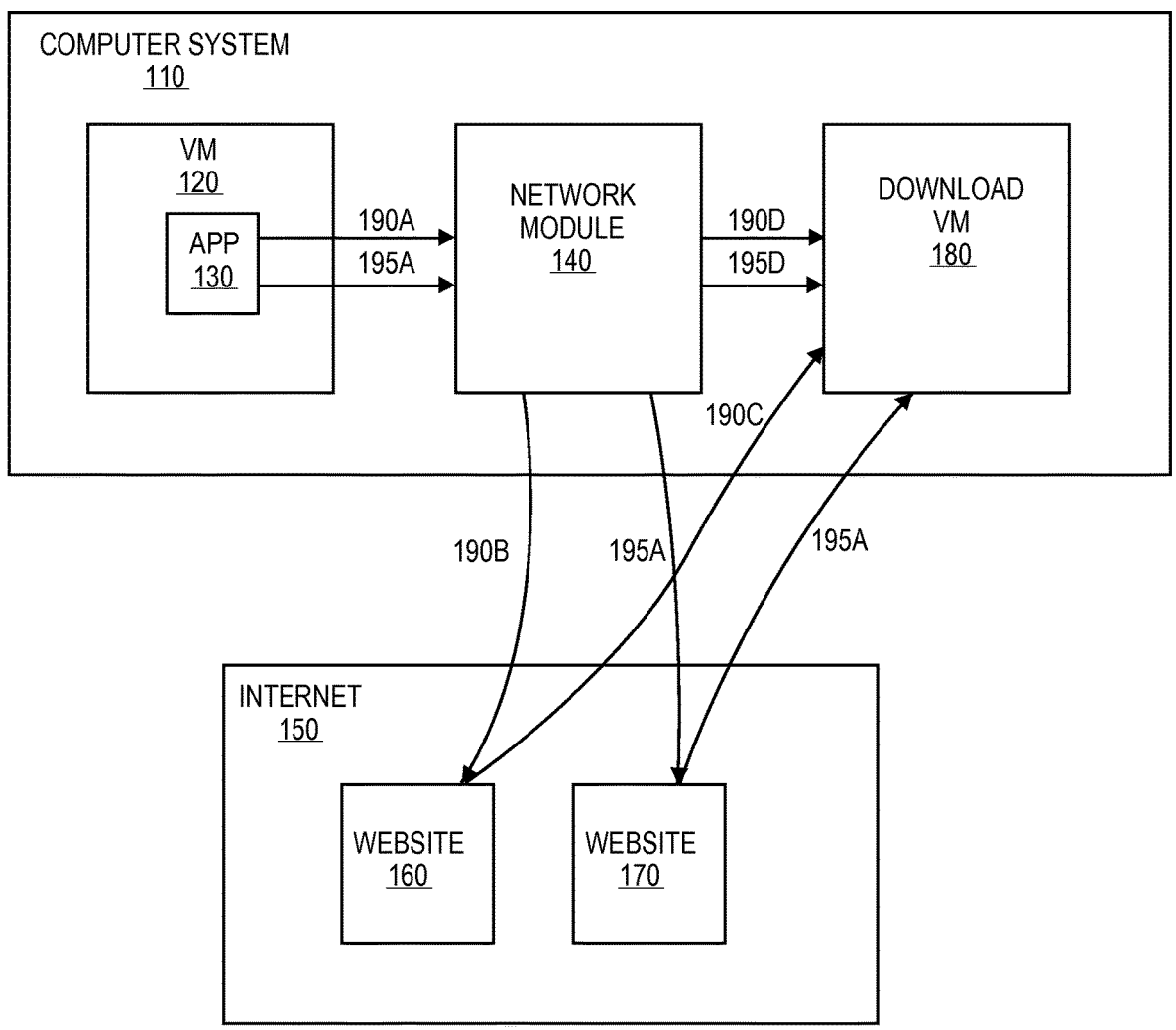
FIG. 1 is a flowchart illustrating the functional steps of ensuring a digital file does not contain malicious code according to an embodiment of the invention.

FIG. 1 is a block diagram of system according to an embodiment of the invention. The system of FIG. 1 depicts computer system 110 that comprises a VM 120, network module 140, and download VM 180. Not pictured in FIG. 1 is a host operating system which, as broadly used herein, is intended to broadly represent any type of operating system which functions as the primary operating system installed upon computer system 110.

Virtual machine 120 is intended to represent a virtual machine that is instantiated on computer system 110. A request to download data may originate inside virtual machine 120 or in the host operating system of computer system 110.

Download VM 180 is intended to represent a virtual machine that is instantiated on computer system 110. Download VM 180 is designed to be the single location in computer system 110 at which all data being requested to be downloaded or transferred to computer system 110 from an external location is stored. In an embodiment, download VM 180 is designed to only enable certain functions related to this role, and so, only certain activity, such as network activity and the storing bytes of data, may be permitted within download VM 180. Download VM 180 does not have access to sensitive resources of computer system 110, such as the file system, certain areas of memory, and the disk.

Besides virtual machine 120 and download VM 180, computer system 110 may have a plurality of virtual machines instantiated simultaneously. Thus, embodiments of the invention may be employed with a computer system 110 having many instantiated virtual machines at any given time.

As shown in FIG. 1, virtual machine 120 comprises application 130. Application 130 is intended to broadly represent any program, process, or task that may request data to be downloaded or retrieved from a remote location over a network, such as the Internet. Non-limiting, illustrative examples of application 130 include an Internet browser (such as Microsoft Internet Explorer or Mozilla Firefox), a File Transfer Protocol (FTP) program, an application capable of retrieving a file from over a network, and so forth.

Network module 140 is intended to broadly represent software that is used to identify a download request emanating from VM 120 or the host operating system, extract certain parameters from the request, and in an embodiment, direct the stream of bytes comprising the download to a separate VM (namely, download VM 180).

The functions and responsibilities of both network module 140 and download VM 180 shall be discussed in greater detail below and with reference to FIG. 2.

FIG. 1 further depicts Internet 150 and two exemplary web sites, namely web site 160 and web site 170. Internet 150 may be broadly construed to represent any external network (such as the Internet) and any network that may be reached by application 130 (such as an internal network or Intranet). Web sites 160 and 170 may be broadly construed to represent external sources of data (e.g., files) that are requested by application 130. While FIG. 1 and the specification discuss these external sources of data in the context of web sites for purposes of providing a concrete example, it should be understood that the term "web sites" should not be so limited. The term "web sites" may include FTP repositories, cloud storage, and the like.

In normal use, a web browser contacts a web site and retrieves one or more files comprising code (usually interpreted by the browser), such as an HTML file, a PHP file, a JavaScript file, and so forth. A link in the code is displayed for a user to activate. When this link is selected, a download request is initiated. The download request is sent to a web site for a particular file. The file is then streamed to a storage device controlled by a file system.

In the example embodiment of FIG. 1, application 130 executing in virtual machine 120 issues a download request 190A directed to web site 160. However, unlike prior approaches, a network module 140 intercepts download request 190A. Network module 140 may comprise a network stack being utilized by VM 120 (e.g., the network stack of the host OS) or may correspond to code executing either in VM 120 or in the host OS.

In one example, network module 140 extracts parameters associated with download request 190A (such as the IP address of web site A 160, the transfer protocol, and so forth) and sends the download request 190B to web site 160. As part of download request 190B, network module 140 may also accept and write cookies to storage and take other actions necessary to initiate receiving a stream of bytes comprising the download 190C, which is routed to a separate download VM 180. In an embodiment, download VM 180 is instantiated on-demand and solely for the purpose of doing network activity and writing bytes to a file system. In alternate embodiments, network module may extract download request 190A and transfer (190D) the request to download VM 180 rather than opening a connection 190B to web site 160. In this example, download VM 180 opens a network connection 190C to web site 160 and initiates the stream of bytes 190C.

Application 130 may make a second download request 195A to the same web site 160 or a different web site 170, either after the first download request 190A has completed or concurrent with it. This second download request 195A is processed in the same manner as the first download request 190A and is transferred to the download VM 180, which in the example of concurrent downloads is now handling two download requests, namely requests 190A and 195A.

According to an embodiment, the approaches described herein are envisioned as being performed in the context of a host executing at least one micro-virtual machine (or micro-VM), where instead of virtualizing multiple operating systems, the micro-VM (via a micro hypervisor or microvisor) isolates (via hardware and/or software) each application task within a single running OS in a lightweight micro-VM. In an embodiment, a microvisor uses hardware virtualization to guarantee that micro-VMs are isolated from the OS and each other. In this way, each untrustworthy task is automatically, instantly and invisibly isolated within a tiny micro-VM that has no access to enterprise data or networks, and which cannot modify the desktop. In one embodiment, a group of micro-VMs may be a plurality of virtual machines executing in a computing environment, where each task executes in a separate virtual machine instantiated for the particular task.

Transferring Downloads to a Separate Virtual Machine

Figure 2:
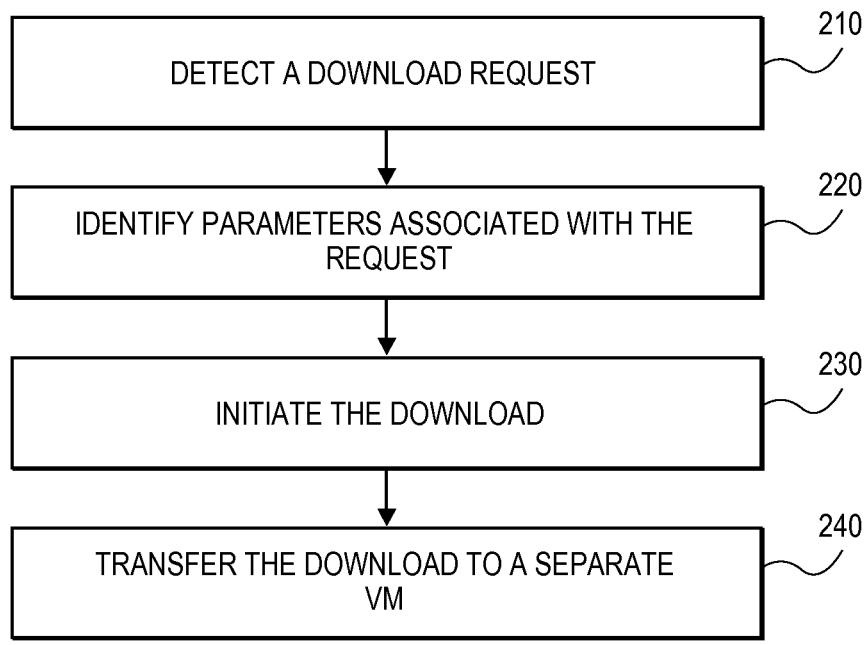
FIG. 2 is a diagram of various locations within a computer network where the steps of FIG. 1 may be performed according to an embodiment of the invention.

FIG. 2 is a flowchart illustrating the functional steps of transferring a download request to a separate virtual machine according to an embodiment. In step 210, a request to download a file from an external location (such as a web site, a FTP server, or the like) is detected. In an embodiment, the detection of a request to download a file may occur at the network stack level. In various embodiments, a module comprising code may execute on the host operating system or in a virtual machine and may detect the download request.

The request may arise from one of many actions. In one example, a web browser executes in a VM (e.g., a micro virtual machine instantiated for the particular browsing session only) and process a user request to initiate a download from a location over the Internet, such as a web site. As another example, a process executing on the host operating system may initiate a download of a file from a location over Internet 150.

In step 220, parameters associated with the request of step 210 are identified and, in some embodiments, extracted. These parameters may include, for example, one or more IP addresses of various Internet locations where data is located or where some form of connection must be made in order to download the file (e.g., receiving a cookie from a third party web site), transfer protocol information, authentication information (e.g., user name and password), and so forth. The purpose of extracting this information in step 220 is so all information necessary to communicate with the location at which the data-to-be-downloaded resides is obtained.

In step 230, the download is initiated. In an embodiment, network module 140 may establish a connection with the external location using the information extracted in step 220. Alternately, this connection may be made by download VM 180. For example, the parameters extracted in step 220 may be transferred to download VM 180 and subsequently employed by download VM 180 to initiating the connection to the external location from which the data is to be downloaded or retrieved.

In step 240, the download initiated in step 230 is transferred to a separate VM (download VM 180). In some examples, there may be multiple downloads occurring from multiple external locations, each initiated by a different application executing in its own VM. Download VM 180 may be responsible for managing all the data streams from all active downloads. There may be, but need not be, multiple download VMs 180 executing concurrently (only a single download VM 180 is shown in FIG. 1).

In an embodiment, download VM 180 is instantiated only when a download is detected. In an example, download VM 180 does not interpret or execute any code being downloaded. Download VM 180 may be restricted from executing any processes except for those required to manage and store the data stream. For example, download VM 180 may not be allowed to execute a browser or any other application such as a word processor. In this manner, download VM 180 is dedicated solely to doing network activity and streaming bytes to the file system and storage.

In an embodiment, the data transfer may be an upload instead of a download. For example, a user executing a browser in a VM may connect to a cloud storage site and initiate an upload. In this example, the upload would be detected using the same techniques, and the upload migrated to a separate VM in which the data transfer is managed and performed.

Hardware Mechanisms

Figure 3:
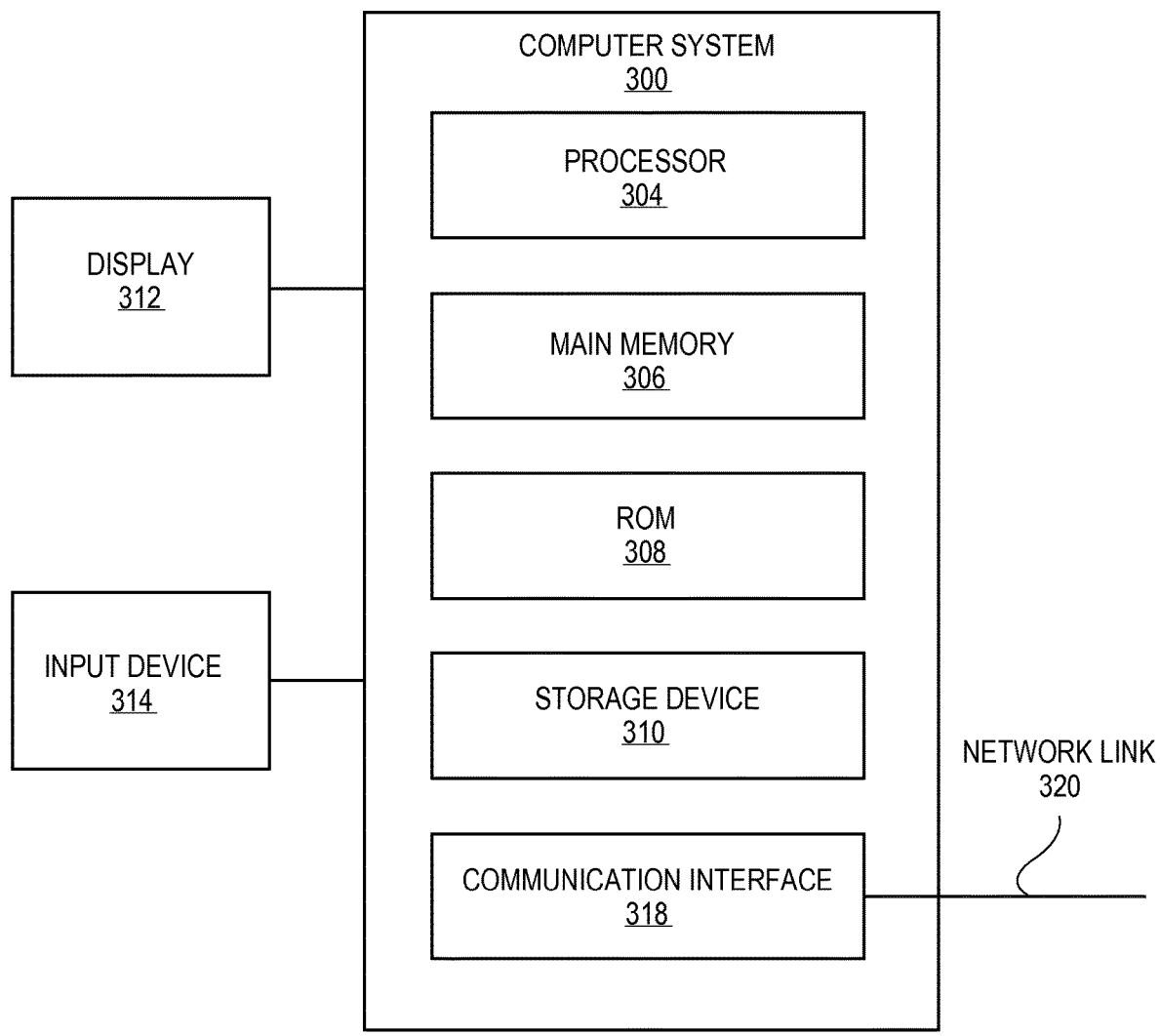
FIG. 3 is a block diagram that illustrates a computer system upon which an embodiment of the invention may be implemented.

FIG. 3 is a block diagram that illustrates a computer system 300 upon which an embodiment of the invention may be implemented. In an embodiment, computer system 300 includes processor 304, main memory 306, ROM 308, storage device 310, and communication interface 318. Computer system 300 includes at least one processor 304 for processing information. Computer system 300 also includes a main memory 306, such as a random access memory (RAM) or other dynamic storage device, for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device for storing static information and instructions for processor 304. A storage device 310, such as a magnetic disk or optical disk, is provided for storing information and instructions.

Computer system 300 may be coupled to a display 312, such as a cathode ray tube (CRT), a LCD monitor, and a television set, for displaying information to a user. An input device 314, including alphanumeric and other keys, is coupled to computer system 300 for communicating information and command selections to processor 304. Other non-limiting, illustrative examples of input device 314 include a mouse, a trackball, or cursor direction keys for communicating direction information and command selections to processor 304 and for controlling cursor movement on display 312. While only one input device 314 is depicted in FIG. 3, embodiments of the invention may include any number of input devices 314 coupled to computer system 300.

Embodiments of the invention are related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any tangible medium that participates in storing instructions which may be provided to processor 304 for execution. Such a medium may take many forms, including but not limited to, non-volatile media and volatile media. Non-volatile media includes, for example, optical or magnetic disks, such as storage device 310. Volatile media includes dynamic memory, such as main memory 306.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 304 for execution. For example, the instructions may initially be carried on a magnetic disk of a remote computer. The remote computer can load the instructions into its dynamic memory and send the instructions over a network link 320 to computer system 300.

Communication interface 318 provides a two-way data communication coupling to a network link 320 that is connected to a local network. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through a local network to a host computer or to data equipment operated by an Internet Service Provider (ISP).

Computer system 300 can send messages and receive data, including program code, through the network(s), network link 320 and communication interface 318. For example, a server might transmit a requested code for an application program through the Internet, a local ISP, a local network, subsequently to communication interface 318. The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory computer-readable storage medium that stores one or more sequences of instructions for safely receiving information from an apparatus, which when executed by one or more processors, causes:
    upon intercepting, at a network stack level on a computer system, from a process executing within a first virtual machine or a host operating system running on the computer system, a request to transfer data from an external location to the computer system, initiating a connection with the external location using parameters identified in the request; and
    performing the request by transferring the data from the external location to a second virtual machine, running on the computer system, which is prohibited from interpreting or executing the data transferred from the external location.

2. The non-transitory computer-readable storage medium of claim 1, wherein the second virtual machine is instantiated in response to determining that the process is requesting to transfer data from an external location.

3. The non-transitory computer-readable storage medium of claim 1, wherein the second virtual machine is receiving data concurrently from a plurality of external locations.

4. The non-transitory computer-readable storage medium of claim 1, wherein initiating the connection is performed by the second virtual machine.

5. The non-transitory computer-readable storage medium of claim 1, wherein initiating the connection is performed by a host module that executes external to the first virtual machine or the second virtual machine.

6. The non-transitory computer-readable storage medium of claim 1, wherein the parameters identified in the request includes at least one cookie associated with the external location.

7. The non-transitory computer-readable storage medium of claim 1, wherein the second virtual machine does not have access to the file system of the computer system and cannot persistently store data on the computer system.

8. The non-transitory computer-readable storage medium of claim 1, wherein intercepting, at the network stack level, a request to transfer data from said external location to the computer system is performed using a network stack of the host operating system.

9. An apparatus configured to safely receive information from another apparatus, comprising:
    one or more processors; and
    one or more non-transitory computer-readable storage mediums storing one or more sequences of instructions, which when executed by the one or more processors, causes:
        upon intercepting, at a network stack level on a computer system, from a process executing within a first virtual machine or a host operating system running on the computer system, a request to transfer data from an external location to the computer system, initiating a connection with the external location using parameters identified in the request; and
        performing the request by transferring the data from the external location to a second virtual machine, running on the computer system, which is prohibited from interpreting or executing the data transferred from the external location.

10. The apparatus of claim 9, wherein the second virtual machine is instantiated in response to determining that the process is requesting to transfer data from an external location.

11. The apparatus of claim 9, wherein the second virtual machine is receiving data concurrently from a plurality of external locations.

12. The apparatus of claim 9, wherein initiating the connection is performed by the second virtual machine.

13. The apparatus of claim 9, wherein initiating the connection is performed by a host module that executes external to the first virtual machine or the second virtual machine.

14. The apparatus of claim 9, wherein the parameters identified in the request includes at least one cookie associated with the external location.

15. The apparatus of claim 9, wherein the second virtual machine does not have access to the file system of the computer system and cannot persistently store data on the computer system.

16. A method for safely receiving information from another apparatus, comprising:
    upon intercepting, at a network stack level on a computer system, from a process executing within a first virtual machine or a host operating system running on the computer system, a request to transfer data from an external location to the computer system, initiating a connection with the external location using parameters identified in the request; and performing the request by transferring the data from the external location to a second virtual machine, running on the computer system, which is prohibited from interpreting or executing the data transferred from the external location.

17. The method of claim 16, wherein the second virtual machine is instantiated in response to determining that the process is requesting to transfer data from an external location.

18. The method of claim 16, wherein the second virtual machine is receiving data concurrently from a plurality of external locations.

19. The method of claim 16, wherein initiating the connection is performed by the second virtual machine.

20. The method of claim 16, wherein initiating the connection is performed by a host module that executes external to the first virtual machine or the second virtual machine.

21. The method of claim 16, wherein the parameters identified in the request includes at least one cookie associated with the external location.

22. The method of claim 16, wherein the second virtual machine does not have access to the file system of the computer system and cannot persistently store data on the computer system.

* * * * *